United States Patent
Wakabayashi (10) Patent No.: US 7,593,571 B2
(45) Date of Patent: Sep. 22, 2009

(54) COMPONENT EDGE DETECTING METHOD, COMPUTER-READABLE RECORDING MEDIUM AND COMPONENT INSPECTION APPARATUS

(75) Inventor: Akihiro Wakabayashi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 915 days.

(21) Appl. No.: 10/986,846

(22) Filed: Nov. 15, 2004

(65) Prior Publication Data

US 2006/0023934 A1     Feb. 2, 2006

(30) Foreign Application Priority Data

Jul. 30, 2004   (JP)   ............... 2004-223926

(51) Int. Cl.
    G06K 9/30   (2006.01)
    G06K 9/34   (2006.01)
(52) U.S. Cl. ...................... 382/173; 382/151

(58) Field of Classification Search ......... 382/141–152, 382/164, 171, 173; 348/135, 586, 596
See application file for complete search history.

(56) References Cited

U.S. PATENT DOCUMENTS 5,870,488 A * 2/1999 Rush et al. .................. 382/151

FOREIGN PATENT DOCUMENTS

| JP | 63-229577 | 9/1988 |
| JP | 2003-110298 | 4/2003 |
| JP | 2003-346165 | 12/2003 |

* cited by examiner

Primary Examiner—Duy M Dang
(74) Attorney, Agent, or Firm—Fujitsu Patent Center (57) ABSTRACT

A method for detecting an edge of a component mounted on a substrate, comprising: a first edge detecting step detecting an edge of the component from image data of the component based on a predetermined first characteristic; and a second edge detecting step detecting an edge of the component from image data of the component based on a predetermined second characteristic.

12 Claims, 8 Drawing Sheets

COMPONENT EDGE DETECTING METHOD, COMPUTER-READABLE RECORDING MEDIUM AND COMPONENT INSPECTION APPARATUS

BACKGROUND OF THE INVENTION

1. Field of the Invention

The present invention relates to a component edge detecting method, a component edge detecting program and a component inspection apparatus, and, in particular, to a component edge detecting method applicable to an appearance inspection for an electronic component mounted on a printed circuit substrate, a component edge detecting program for causing a computer to execute the method, and a component inspection apparatus carrying out this method.

2. Description of the Related Art

Inspection of respective electronic components mounted on a printed circuit substrate carried out before shipping of the circuit substrate which will be used in an electronic apparatus or such, includes a verification as to whether or not predetermined electronic components are positively mounted, whether or not the mounted positions thereof are proper, whether or not soldering connections between electrodes of the electronic components and electrically conductive patterns provided on the printed circuit substrate are proper, or such. Upon carrying out these verification operations, for reasons that these particular electronic components are very small (on the order of point millimeters, for example), it is necessary to carry out the verification operations on many of these products within a limited duration, or such, it may be difficult or it may be not suitable to carry out these inspection operations visually with naked eyes directly. Therefore, a method is demanded for taking a photograph of the to-be-inspected printed circuit substrate and analyzing the thus-obtained image through analytic processing with the use of a computer program so as to carry out these inspection operations efficiently.

Figure 1:
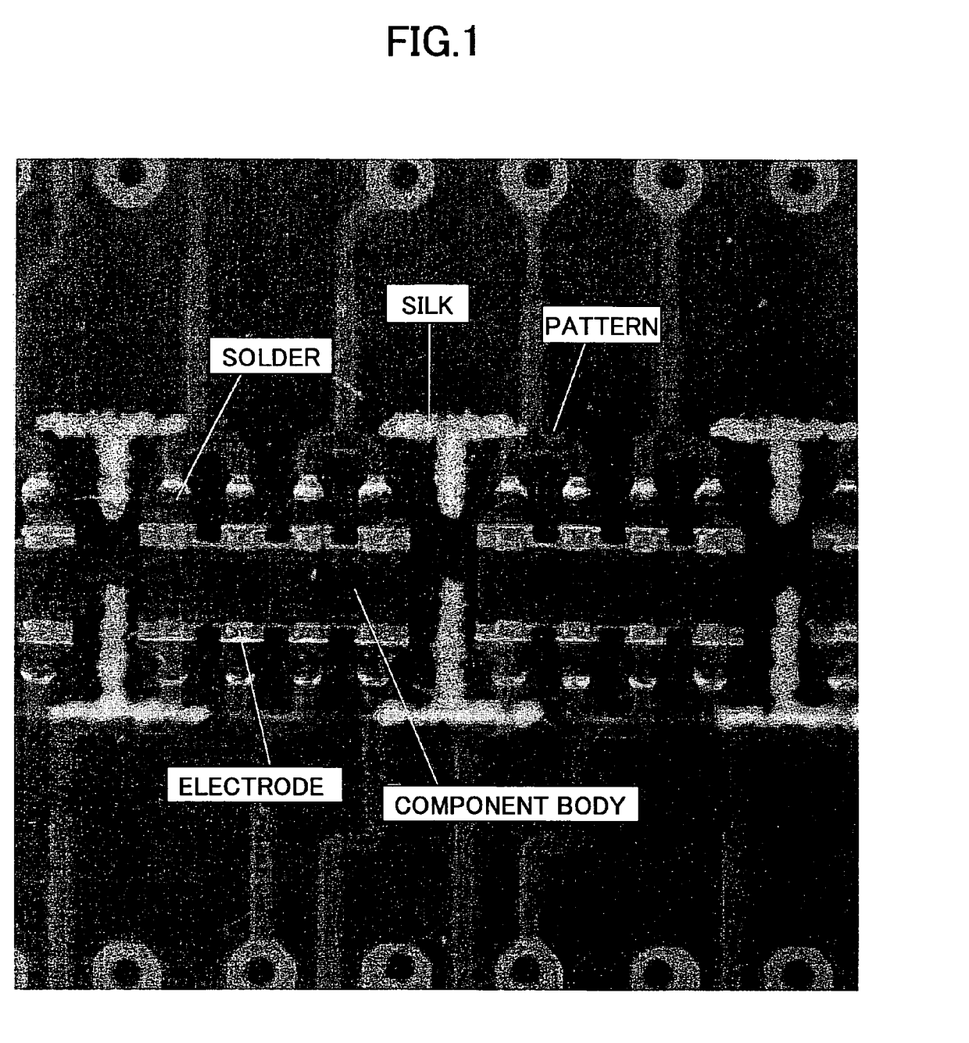
FIG. 1 shows a configuration in which electronic components are mounted on a printed circuit substrate.
Figure 2:
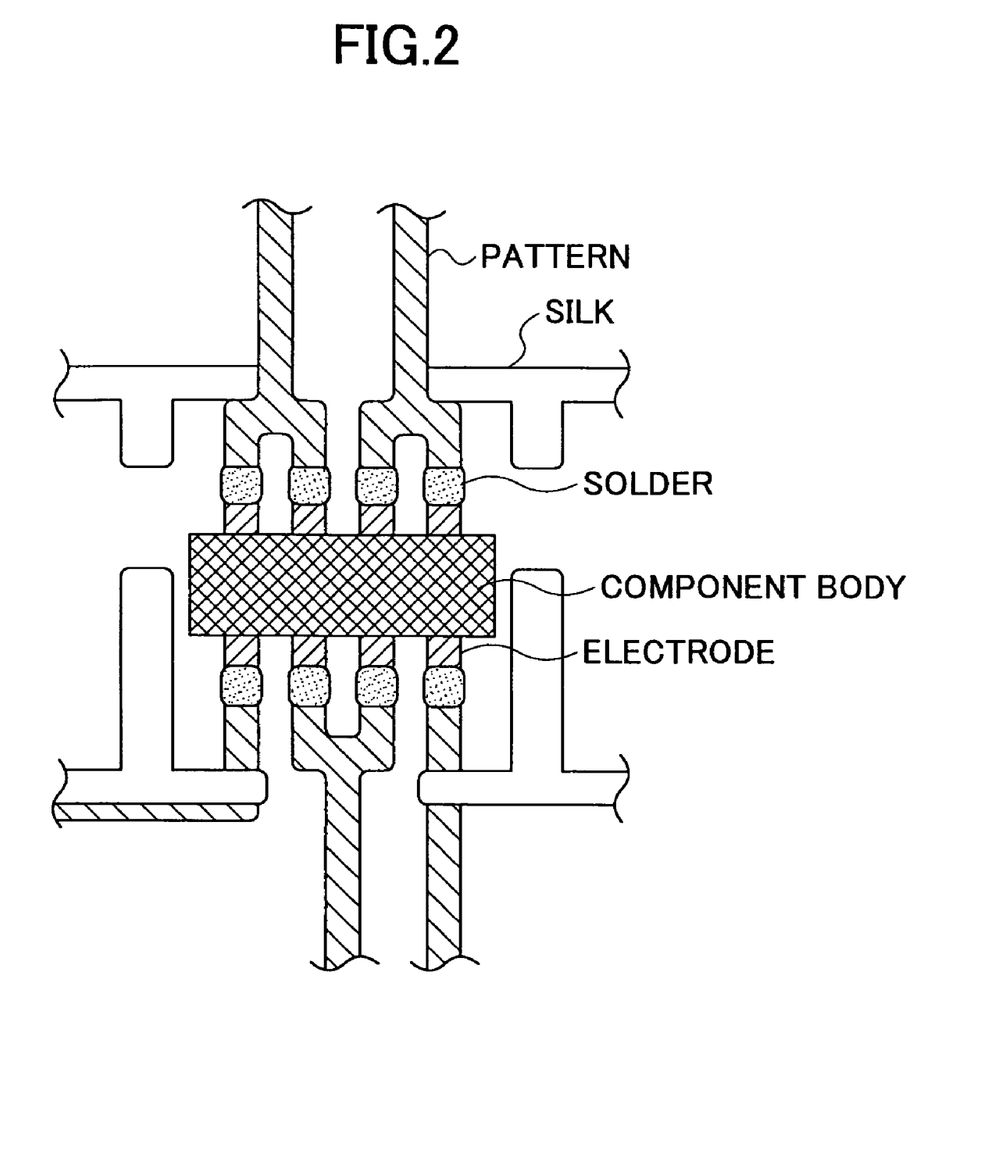
FIG. 2 illustrates a part of FIG. 1 in an easily understandable manner.

FIG. 1 shows a magnified view of one example of such a to-be-inspected printed circuit substrate. Further, FIG. 2 illustrates a part of FIG. 1 in an easily understandable manner. As shown, an electronic component including a component body and electrodes are mounted on the printed circuit substrate on which electrically conductive patterns (indicated in the figures as PATTERN) are previously printed. As a result of the electrodes and the electrically conductive patterns being soldered (indicated in the figures as SOLDER) together, both are electrically connected together, and also, the electronic component having the electrodes are fixedly mounted on the printed circuit substrate.

For example, Japanese Laid-open Patent Application No. 2003-110298 discloses a technology concerning a mounted component inspection apparatus for carrying out inspection for verifying as to whether there is a positional error of electronic components mounted on a printed circuit substrate. According to the technology, for an electronic component having a body part and an electrode part, comparison processing is carried out on an image of the substrate on which the electronic component is mounted, with the use of a matching plate extracted from the image, in particular, from an edge part of the electrode part except a boundary line between the body part and the electrode part. Thereby, inspection for verifying as to whether components are actually mounted, whether there is no erroneous mounting, and whether the components are mounted in a proper manner is carried out.

Japanese Laid-open Patent Application No. 63-229577 discloses a technology in which, upon obtaining edge information of objects for the purpose of obtaining shape information of the objects having cross-sectional shapes configuring a latex grain aggregate, a fiber aggregate or such, noise information present in a background of the objects is positively removed so as to improve the preciseness and the processing speed of the edge detection processing.

Japanese Laid-open Patent Application No. 2003-246165 discloses a technology relating to appearance inspection for a mirror surface member or such directed to the improvement in the accuracy and the speed of component edge detection processing even when much noise is included, upon extracting an inspection target from an area of an image including a to-be-inspected object.

SUMMARY OF THE INVENTION

Figure 3A:
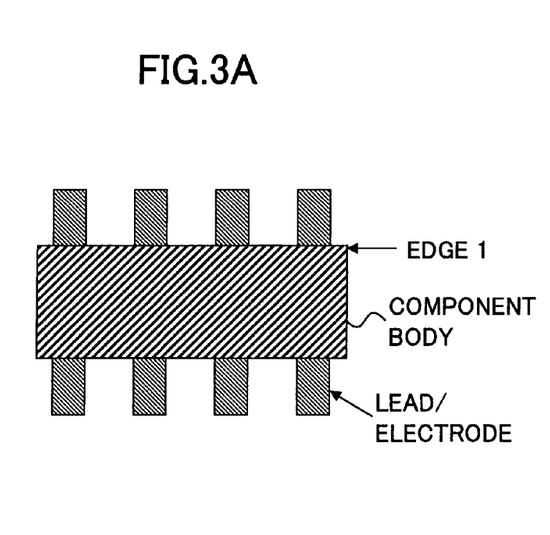
FIGS. 3A-3C illustrates a problem which may occur in the related art.
Figures 3B, 3C:
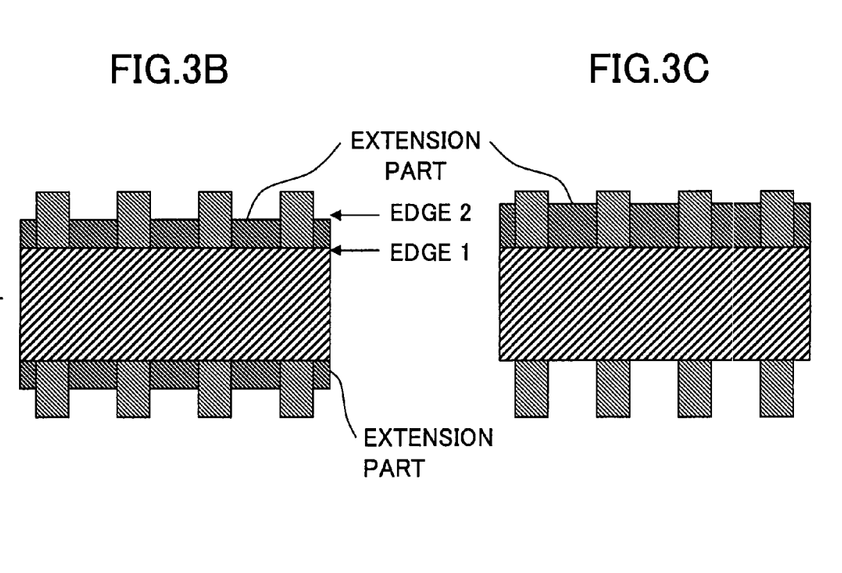

Generally speaking, an electronic component mounted on a printed circuit substrate has an outer shape such as that shown in FIG. 3A. Other than this, there are those having outer shapes shown in FIGS. 3B and 3C. In the example of FIG. 3B or 3C, an extension part is provided so that it has double edges (an edge 1 and an edge 2). In the case of FIG. 3B, the inter edge 1 and the outer edge 2 which exists further outside of the edge 1 exist on each of both sides of the electronic component as shown. In this case, the outer edge 2 is the real edge of the electronic component. However, when the edge 1 is detected as the edge of the electronic component for the purpose of product inspection such as that described above, it corresponds to an erroneous detection.

For example, when verification as to whether soldering connection is properly carried out is carried out as one item of appearance inspection of an electronic component, as shown in FIG. 2, it is verified as to whether soldering between an electrode of the component and an electronically conductive pattern of the substrate has been made properly. In this case, the soldering connection to be verified exists at a part of the electrode externally projecting from the real edge of the electronic component. Accordingly, if the outer edge 2 of the electronic component cannot be properly detected as mentioned above, this determination as to whether or not the soldering connection has been properly carried out cannot be made precisely.

It is noted that, in the specification of the present application, the term 'electronic component' has a wide concept having a meaning of not only an active electronic component such as a common IC but also a passive electronic component such as a resistor or such which includes no active device such as a transistor.

If the edge 1 which is the inner edge is detected as the real edge for the product inspection in FIG. 3B, this means that a part of the electrode existing inside of the real edge 2 is regarded as the part of the electrode projecting externally. However, since this part of the electrode existing between the edges 1 and 2 is not a part which actually projecting externally, even if soldering is detected at this part, this soldering cannot actually contribute to electrical connection with the electrically conductive pattern provided on the printed circuit substrate. Accordingly, if it is determined that soldering has been carried out properly from the fact that the soldering is detected at this part, this determination corresponds to an erroneous determination accordingly.

Thus, in a case where an electronic component has double edges as shown in FIG. 3B or 3C, it is necessary to finally detect the outer edge (edge 2) to be applied for the product inspection. However, according to the above-mentioned prior arts, such a configuration of a component having such double edges is not assumed, and thus, there may be a possibility that the inner edge 1 is erroneously detected for the product inspection when edge detection is carried out on the configuration such as that shown in FIG. 3B or 3C with only assuming a configuration of a component such as that shown in FIG. 3A.

Specifically, upon carrying out edge detection on such an electronic component, a method may be applied in which image information including an image of the relevant component is used, and, for example, a specific color, a specific brightness or such is used as an index for detecting a position at which color information, brightness information or such shifts in step manner according to a threshold method or such. In such a case, in a case of handling the component such as that shown in FIG. 3A, the threshold value is previously determined with reference to a color or a brightness of the relevant component body which is previously measured from a typical model or such, and, with the use of this threshold value, a position at which image information, i.e., color information or brightness information exceeds the threshold value may be detected from the image information including the image of the relevant component, as the above-mentioned position of shifting in a step manner. Then when such a method is applied for the component shown in FIG. 3B, the inner edge 1 may be erroneously detected as the edge for the product inspection assuming that the above-mentioned extension part present between the edges 1 and 2 has a color or a brightness already exceeding the above-mentioned threshold, which means that detection is made that the edge of the component body has been already crossed. As a result, the above-mentioned erroneous determination may occur.

As a method of solving this problem, for example, an extension length of the above-mentioned extension part present between the edges 1 and 2 shown in FIG. 3B may be previously registered as an offset value, and, when the edge 1 is detected first, this offset value may be always added to determine a final edge position. However, generally speaking, such an extension length has a some amount of variation or error for each particular product. Accordingly, this extension length may not be fixed, and as a result, it is difficult to carry out precise edge detection even if this method is applied.

As another method, a special threshold for detecting the outer edge 2 of the extension part may be previously set. However, when this method is applied to a case where the configuration of a component such as that shown in FIG. 3C is handled in which the extension part is provided only on a single side of the component, edge detection may be failed in finally during a process of edge detection for detecting the edge 2 on the side on which no extension part actually exists.

The present invention has been devised for the purpose of solving the problem, and an object of the present invention is to provide a component edge detecting method by which, without regard to whether or not the above-mentioned extension part is actually provided in a target component, as shown in FIG. 3A, 3B or 3C, the real edge for the product inspection can be always detected precisely without failure.

According to the present invention, for the purpose of achieving the above-mentioned object, a first edge detecting step detecting an edge of a component from image data of the component based on a predetermined first characteristic; and a second edge detecting step detecting an edge of the component from the image data of the component based on a predetermined second characteristic are carried out.

By thus carrying out the plurality of different steps of detecting edges of the given component, the edge 1 is detected first in the case of FIG. 3B, and then, the edge 2 is detected. On the other hand, when the edge 2 does not exist as in the case of FIG. 3A, the edge 1 first detected as mentioned above is regarded as the real edge to be used for the product inspection. Accordingly, in any case of the FIGS. , 3B and 3C, the real edge can be positively detected precisely without failure.

Thus, according to the present invention, as a result of carrying out a plurality of edge detecting steps, it is possible to precisely detect a real edge of a component (electronic component, for example) without regard to whether or not this component actually has an extension part and also without regard to an actual extending length of the extension part if any, as shown in FIG. 3B or 3C.

DETAILED DESCRIPTION OF THE PREFERRED EMBODIMENTS

Figure 4A:
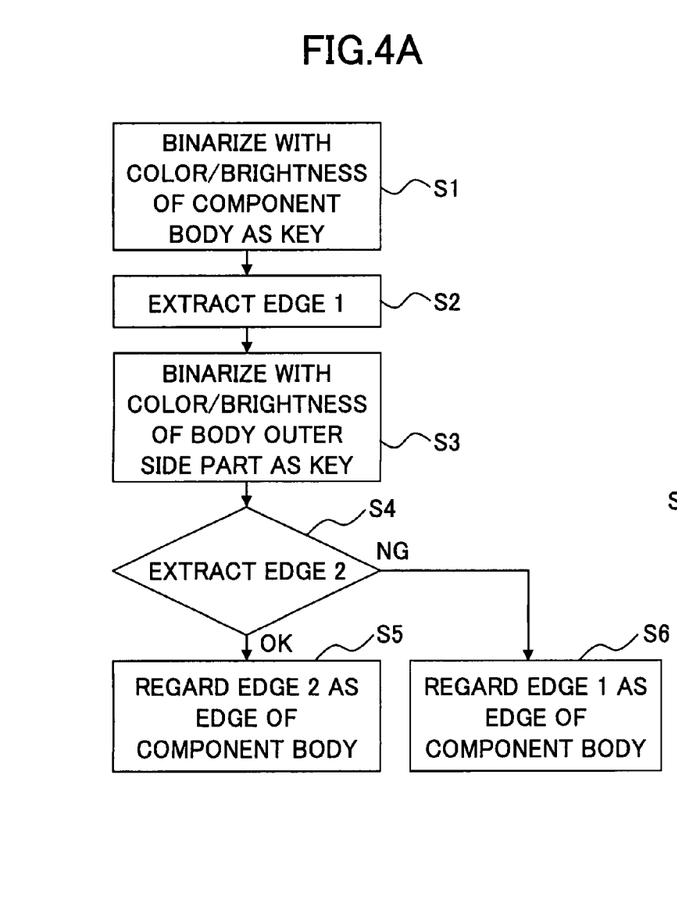
FIGS. 4A and 4B show flow charts of operations according to embodiments of the present invention.
Figure 4B:
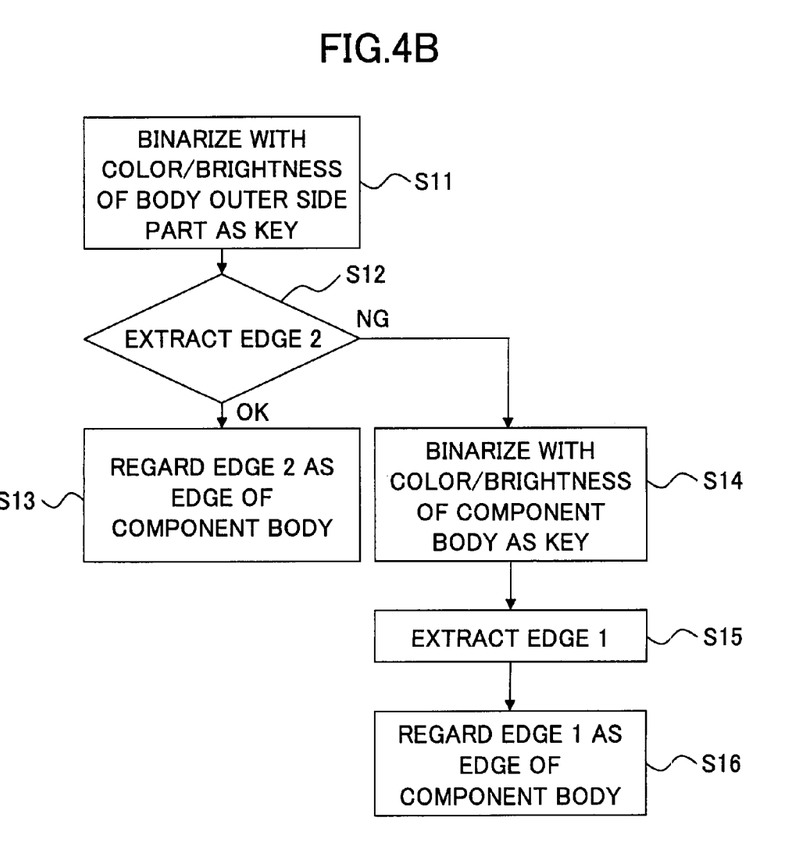

FIGS. 4A and 4B show operation flow charts illustrating a basic concept of embodiments of the present invention.

In a scheme of FIG. 4A, in Step S1, data of a photographed image of a to-be-inspected component body is binarized with the use of a color or a brightness of the component body as an index. In Step S2, the edge 1 shown in FIG. 3A, 3B or 3C is detected. Then, in Step S3, the above-mentioned photographed image data is binarized for further outside from the edge 1 with the use of a color or a brightness of the extension part, the same as in Step S1. Then, in Step S4, the edge 2 of FIG. 3B or 3C, i.e., the outer edge of the extension part is detected. When the edge 2 has been actually detected in this step (OK), the edge 2 is regarded as the final edge for the product inspection in Step S5, and is output. On the other hand, when the edge 2 could not be actually detected in Step S4 (NG), the edge 1 detected in Step S2 is regarded as the final edge for the product inspection in Step S6, and is output.

Specifically, in the case of FIG. 3A, the threshold value is previously set with the use of a color or a brightness of the component body previously measured for a typical model or such, as an index. Then, with the use of this first threshold value, the given image data is binarized (Step S1). Thereby, the stepwise data shifting part, i.e., a part at which the image data crosses this threshold value is detected. Thus, the edge 1 is detected (Step S2). However, in a case of the electronic component having the configuration of FIG. 3A, no further stepwise data shifting part occurs at which the image data crosses another second threshold, previously set with the use of a color or a brightness of the extension part, previously measured for a typical model or such, as an index, even when the image data is binarized with the use of the thus-set second threshed in the same manner to the further outside from the first-detected edge 1 (Step S3). Therefore, in this case, the result of Step S4 becomes NG finally, and then, in Step S6, the edge 1 is output as the final edge for the product inspection.

On the other hand, in the case of FIG. 3B, the first threshold value previously set with the use of the color or the brightness of the component body previously measured as mentioned above s then used as an index i, and the given image data is binarized (Step S1). Thereby, the edge 1 is first detected (Step S2). Then, in this case, a stepwise data shifting part at which the image data crosses the second threshold value previously set with the use of a color or a brightness of the extension part previously measured as an index is also detected (OK of Step S4) when the image data is binarized with the use of the thus-set second threshed in the same manner to the further outside from the first-detected edge 1 (Step S3). Therefore, in this case, the result of Step S4 thus becomes OK, and then, in Step S5, the edge 2 is output as the final edge for the product inspection.

After that, a predetermined inspection window is set at a position determined based on the position of the final edge for the product inspection thus obtained, on the image of the relevant electronic component. Then, by analyzing the image data defined by the inspection window, whether soldering connection at the position is carried out properly is verified. Specifically, it is determined whether a so-called bridge failure has occurred in which adjacent soldering connections are short-circuited together, whether soldering connection itself has been failed to be actually carried out, or such.

Thus, according to the embodiment of the present invention, even when the electronic component has the extension part as shown in FIG. 3B or 3C, and the extension length of the extension part may vary, it is possible to positively detect the real edge suitable for the product inspection. Therefore, it is possible to verify whether soldering connection has been properly carried out or such at a high accuracy.

In the scheme shown in FIG. 4A, the two edge detecting steps S2 and S4 are provided. However, the number of the edge detecting steps may be further increased if necessary depending on a particular specific configuration of the to-be-inspected component to handle.

FIG. 4B shows another scheme according to an embodiment of the present invention. In this scheme, first, in Step S11, a second threshold value previously set based on the color or the brightness of the extension part previously measured from the typical model thereof or such is used as a key, and the photographed image data is binarized. From the thus-obtained binarized image, the edge 2, i.e., the outer edge of the extension part is detected (Step S12). When the edge 2 has been actually detected (OK in step S12), this means that the extension part exists as shown in FIG. 3B or 3C, and thereby, the stepwise data shifting part, i.e., a part at which the image data crosses the above-mentioned second threshold value occurs also at a boundary between the extension part and the further outer part of the image in which the substrate is exposed. In this case, in Step S13, the thus-detected edge 2 is output as the final edge for the product inspection.

On the other hand, when the edge 2 could not be actually detected, i.e., no extension part exists as shown in FIG. 3A, and as a result, no stepwise data shifting part of the image data at which the second threshold value is crossed occurs (NG in Step S12), and, Step 14 is then executed. In Step S14, a first threshold value previously set based on the color or the brightness of the component body previously measured from the typical model thereof or such is used as a key, and the photographed image data is binarized. From the thus-obtained binarized image, the edge 1, i.e., a boundary or the stepwise data shifting part between the inside and the outside of the component body at which the first threshold value is crossed is detected as the edge 1 (Step S15). Then, the thus-obtained edge 1 is output as the final edge for the product inspection (Step S16).

In each of the above-described schemes of FIGS. 4A and 4B, the threshold method is applied for the purpose of detecting the edge of each of the component body and the extension part. In the case, based on the typical color or brightness previously measured, the threshold value (key) is obtained for carrying out the binarizing processing, i.e., for detecting the stepwise data shifting part. That is, it is expected that the color or the brightness of the component body or the extension part may fall within a certain range depending on a material, a surface treatment or such of the relevant part. Then, the edge thereof can be detected at the position at which the above-mentioned range is clearly exceeded. This phenomenon is utilized for detecting the edge of the component body or the extension part according to the embodiments of the present invention.

Other than the above-mentioned method in which the threshold value for determining the edge is obtained based on the previously measured color or brightness of the typical model or such of the relevant part, the same may be obtained from analysis carried out on the photographed image of the entirety of the relevant electronic component, for each product. In other words, a position at which such an electronic component is mounted on a printed circuit substrate is previously determined according to a predetermined standard, in general. As a result, it is expected that the electronic component should be located at the standard position within a certain amount of a possible positioning error range. Accordingly, by analyzing image data around the standard mounting position in the photographed image, it is possible to estimate data of color or brightness of each of the component body and the extension part of the relevant electronic component. By using this data, the threshold value for determining the edge of each of the relevant parts can be obtained.

With reference to FIGS. 5 through 8B, the embodiments of the present invention are described below in further detail.

Figure 5:
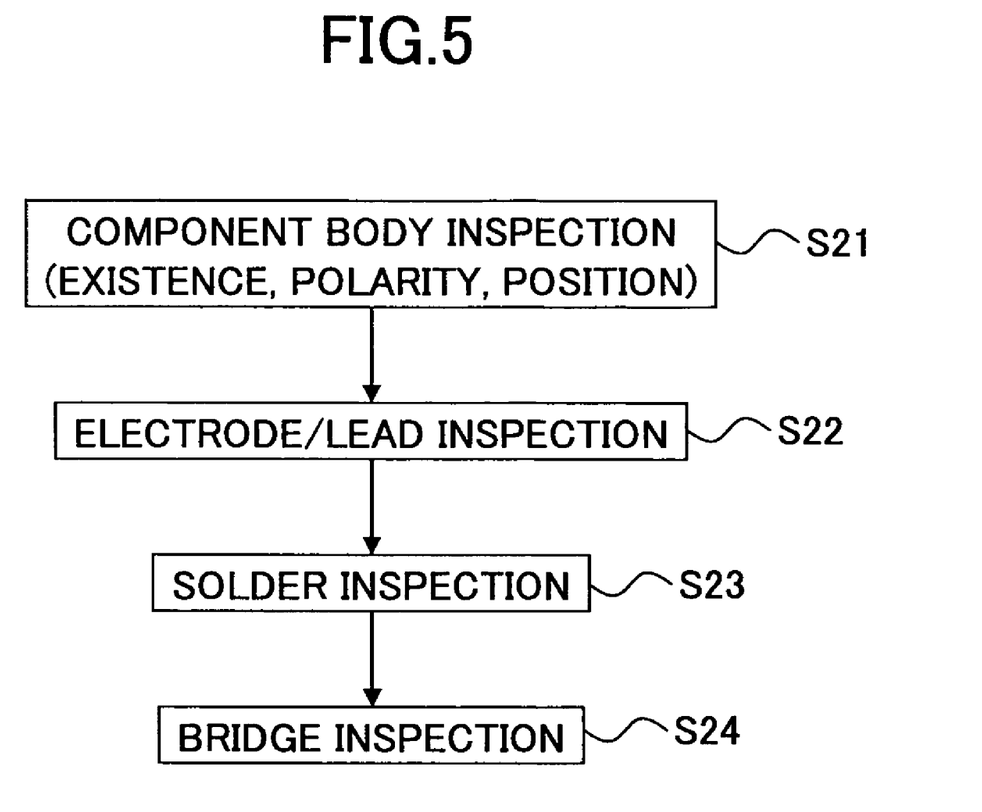
FIG. 5 shows a processing flow chart illustrating a printed circuit substrate appearance inspection method to which a component edge detecting method according to an embodiment of the present invention may be applied.

FIG. 5 shows a general configuration of a printed circuit substrate appearance inspection process according to an embodiment of the present invention.

In this process, first, inspection is made to verify whether each electronic component is mounted on a printed circuit substrate positively, whether a polarity of each electronic component is correctly set, whether each electronic component is located correctly, or such, in Step S21. Then, in Step S22, inspection is made to verify whether electrodes or leads of each electronic component do not have any trouble. After that, in Step S23, inspection is made to verify whether soldering connection between an electrode of each electronic component and an electrically conductive pattern of the printed circuit substrate is done properly. Then, in Step S24, inspection is made to verify whether short-circuit between electrodes or leads together, i.e., bridging, or such, does not occur (bridge inspection). The order of Steps S21 through S24 may be changed arbitrarily.

'A component edge detecting method' according to the present invention may be applied to the 'component body inspection' in Step S21 mentioned above. There, as described above, from a photographed image of the printed circuit substrate, an edge of each electronic component is detected, and, as a result of the thus-detected edge position, a bridge inspection window, for example, is set. Then, on an image part defined by such an inspection window, image data analysis is carried out. Thereby, a short-circuit trouble between electrodes, or such, is searched for at high accuracy.

Figure 6:
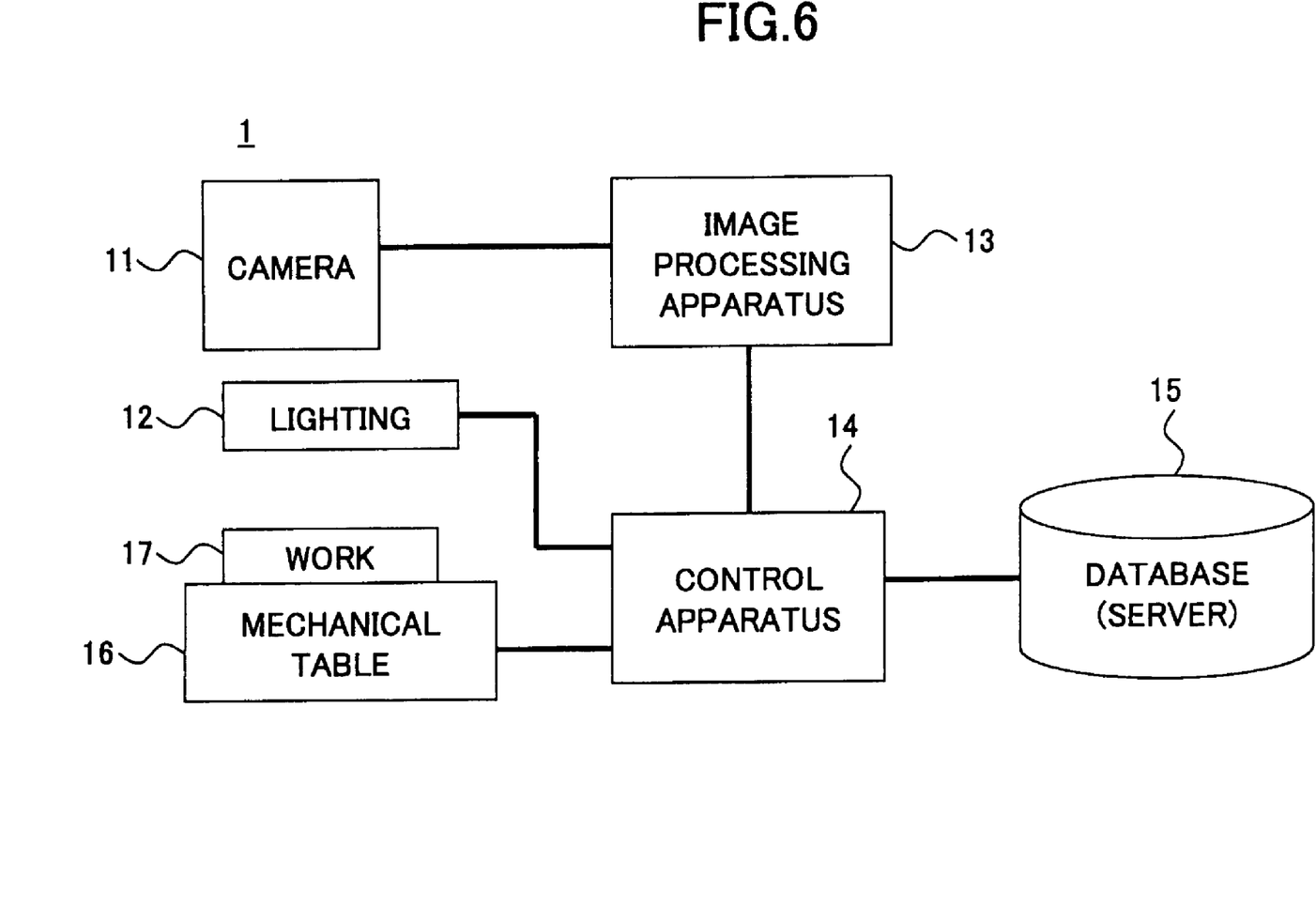
FIG. 6 shows a block diagram of one example of a printed circuit substrate appearance inspection apparatus to which a component inspection apparatus according to an embodiment of the present invention may be applied.

FIG. 6 shows a block diagram of an inspection apparatus in one example carrying out the above-described printed circuit substrate appearance inspection process. As shown, the inspection apparatus according to one embodiment of the present invention includes a mechanical table 16 on which a product (work) 17 of a printed circuit substrate to be inspected (to-be-inspected object) is placed; a lighting device 12 lighting the printed circuit substrate 17 thus-placed on the mechanical table 16; and a camera 11 photographing (or taking a photo of) the thus-lit printed circuit substrate 17.

A positional relationship between the mechanical table 16 and the camera 11, and a positional relationship between the mechanical table 16 and the printed circuit substrate 17 as the to-be-inspected object placed on the mechanical table 16 are set according to predetermined standards. As a result, as long as the printed circuit substrate 17 manufactured according to predetermined design requirements is placed on the mechanical table 16 according to the above-mentioned standard, it is possible to estimate a position of each electronic component mounted on the printed circuit substrate 17 in a photographed image obtained from photographing the printed circuit substrate 17 by means of the camera 11.

Further, the inspection apparatus in the present embodiment includes a control apparatus 14 controlling the lighting device 12 and the mechanical table 16; an image processing apparatus 13 carrying out control of the camera 11 as well as the above-mentioned mentioned binarization of image data taken by the camera 11, or other necessary operations; and a database 15 storing design data for each of the to-be-inspected products to be handled by this inspection apparatus and other necessary data/information.

The control apparatus 14 first calls necessary information from the database 15 concerning the relevant to-be-inspected product (work) 17. Then, the control apparatus 14 controls the lighting device 12 and the mechanical table 16, and sends a signal to the image processing apparatus 13. Therewith, the image processing apparatus 13 sends a signal to the camera 11 so that the camera 11 takes a photograph of the to-be-inspected product 17, and thus obtains the image thereof. The thus-obtained image is then sent to the image processing apparatus 13, which then processes it according to a predetermined manner. The thus-processed image data is then sent to the control apparatus 14. The control apparatus 14 then carries out the inspection process such as that described above with reference to FIG. 5 or will be described in further detail with reference to FIGS. 7, 8A and 8B, and the inspection result is displayed on a monitor device of the control apparatus 14 itself, or a monitor device of the image processing apparatus 13. On the other hand, the inspection result is stored in a storage device of the control apparatus 14 if necessary. In the database 15, the information necessary for the inspection of each electronic component mounted on the printed circuit substrate 17 and the substrate itself is previously registered, and, is used appropriately in the above-mentioned inspection procedure.

As the above-mentioned photographing means, the camera 11 should not be necessarily required. Any other device may be applied for the same purpose as long as it has a function of taking image information of the to-be-inspected product. Further, the example shown in FIG. 6 is configured so that the mechanical table 16 is controlled so that the to-be-inspected product is moved appropriately, and thus, an image of at arbitrary position of the printed circuit substrate 17 can be taken by the camera 11. However, other than this manner, another manner may be applied instead, such that, the table 16 is fixed, while rather the camera 11 photographing the to-be-inspected product 17 is moved appropriately, so that an image at an arbitrary position of the printed circuit substrate 17 can be taken by the camera 11.

Further, the image processing apparatus 13, the control apparatus 14 and the database 15 may be integrated into a unit apparatus.

In the above-described configuration, the control apparatus 14 acts as 'a first edge detecting part detecting an edge of a component based on a predetermined first characteristic, from an image data of the component' and 'a second edge detecting part detecting an edge of the component based on a predetermined second characteristic, from the image data of the component'. However, other than this configuration, it is also possible to configure the inspection apparatus so that rather the image processing apparatus 13 acts as 'a first edge detecting part detecting an edge of a component based on a predetermined first characteristic, from an image data of the component' and 'a second edge detecting part detecting an edge of a component based on a predetermined second characteristic, from the image data of the component'.

Figure 7:
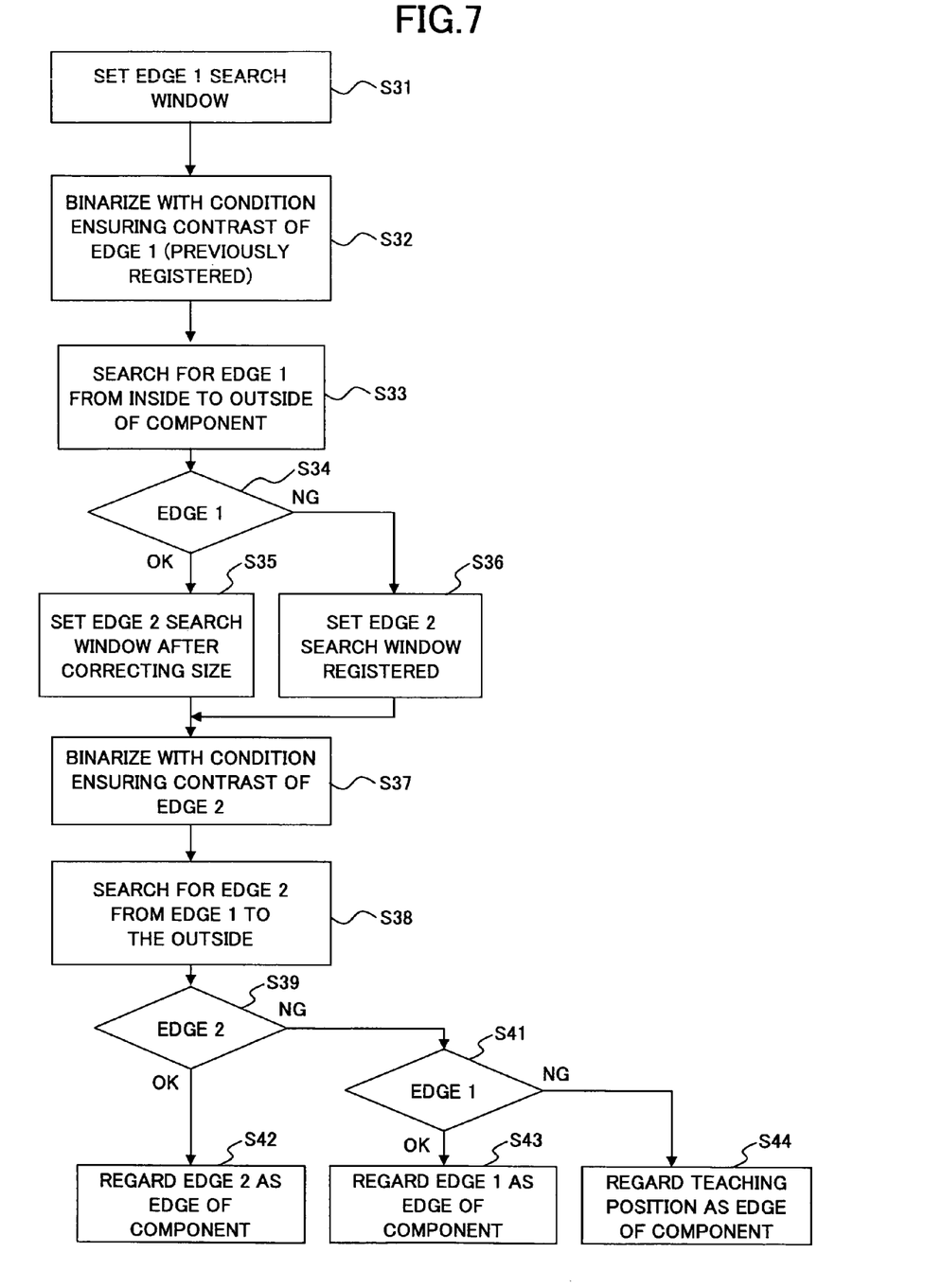
FIG. 7 shows a flow chart illustrating operations of an embodiment of the present invention in further detail.
Figure 8A:
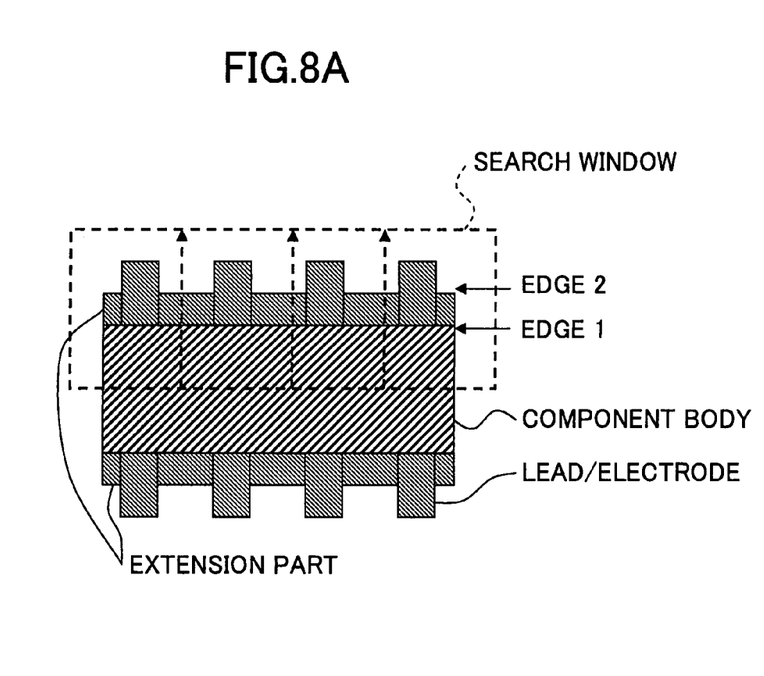
FIGS. 8A and 8B illustrate operations shown in FIG. 7.
Figure 8B:
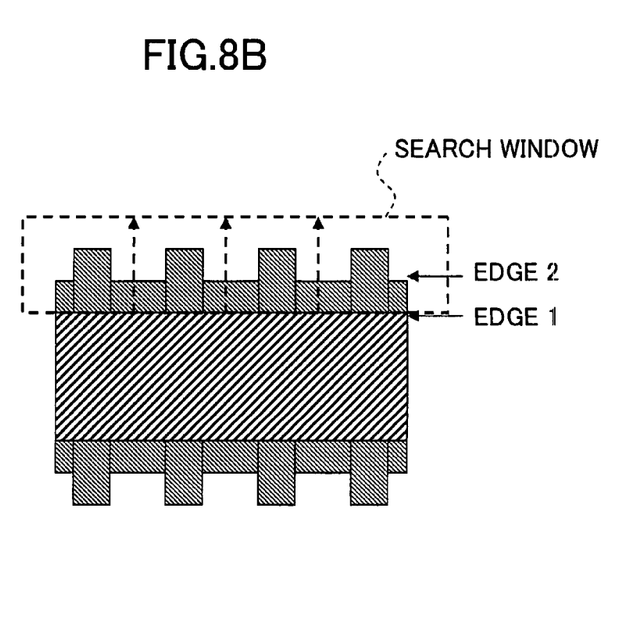

With reference to FIGS. 7, 8A and 8B, an operation flow of a component edge detecting method according to an embodiment of the present invention carried out by the inspection apparatus described above with reference to FIG. 6 is described below.

In Step S31, a previously registered search window is set on an image of an electronic component mounted on the printed circuit substrate 17 which is a to-be-inspected product photographed by the camera 11, at a position around an edge of the electronic component. Design data of the printed circuit substrate as the to-be-inspected is previously stored in the database 15. The control apparatus 14 refers to this design data from the database 15, and therewith, the control apparatus 14 can recognize, within a certain range of positional error in mounting of the electronic component on the printed circuit substrate 17, a position of each electronic component mounted on the printed circuit substrate 17 in the image of the substrate 17 which is placed on the mechanical table 16 at a predetermined position, where the image of the substrate 17 is taken by the camera 11 which is set at a predetermined position. As a result, the control apparatus 14 can set a search window around the edge of the relevant electronic component as shown in FIG. 8A as mentioned above.

In Step S32, for the image part in an area thus defined by the thus-set search window, binarization is carried out in a manner such that a contrast of the edge 1 may be ensured. Specifically, a threshold value is determined as being a maximum possible value of the brightness of the component body in the photographed image, and, with the use of this threshold value as a reference value, the image data is binarized. The threshold value for the binarization is one previously registered. However, other than this manner, as described above, this threshold value may be automatically calculated from the input image information.

In the thus-obtained binarized image, the edge 1 is searched for in Step S33 in a direction from the inside to the outside of the component body. The vertical three arrows of broken lines shown in FIG. 8A represent the direction of search. Specifically, pixel data having a value within a range of reference brightness value of the component body is counted horizontally and vertically. As a result, checking is carried out for each horizontal line as to whether or not a designated width is satisfied. In other words, it is determined whether or not a width for which pixels satisfying the above-mentioned reference brightness value requirement occurs successively corresponds to a previously registered horizontal width of the component body (horizontal width of the component body in FIG. 8A). Then, when a horizontal line each of which satisfies the designated width occurs several times successively, checking is carried out as to whether or not this corresponds to a designated length. In other words, a vertical length for which the horizontal lines each satisfying the above-mentioned requirement occurs successively becomes more than a predetermined length previously registered for the component body. When the designated length is satisfied, the end of the relevant area, i.e., the top end of the component body in FIG. 8A is determined as being the edge (edge 1) of the component (OK in Step S34). When any of the above-mentioned requirements is not satisfied, output is made indicating that the edge 1 has not been detected (NG).

The edge 2 detecting step is then started. The edge 2 detecting method is basically the same as the above-described edge 1 detecting method. However, a search window set in this case is set as described below. That is, when the edge 1 has been detected in Step S34 (OK), the size of the edge 2 search window to set is adjusted in response to the edge 1 detected position (Step S35). In other words, as shown in FIG. 8B, the inner side end (bottom end in the figure) of the search window is shifted to the outer direction, and as a result, the vertical length of the edge 2 search window can be reduced as shown in FIG. 8B from that of the edge 1 search window shown in FIG. 8A.

On the other hand, when the edge 1 could not be detected (NG of Step S34), a position and a size of the search window previously registered are applied as they are for the edge 2 search window (Step S36). In other words, for example, the size and the position of the search window for the edge 1 shown in FIG. 8A are also set again for the edge 2 search windows.

After that, the image area thus defined by the search window is searched in a range from the position at which the edge 1 has been detected to the outside (upwards in FIG. 8A or 8B) for the edge 2 (Steps S37, S38).

Search for the edge 2 in Steps S37 and S38 is carried out as follows: First, binarization is carried out on the image within the search window with respect to a threshold value previously registered for the extension part of the electronic component (Step S37). Then, in Step S38, image data representing a value within a brightness range previously registered for the extension part is counted horizontally and vertically. As a result, checking is carried out for each horizontal line as to whether or not a designated width is satisfied. In other words, it is determined whether or not a width for which pixels satisfying the above-mentioned reference brightness requirement occur successively corresponds to a previously registered horizontal width of the extension part (horizontal width of the extension part in FIG. 8A or 8B). Then, when a horizontal line each of which satisfies the designated width occurs several times successively, checking is then carried out as to whether or not this corresponds to a designated length. In other words, a vertical length (vertical length in FIG. 8A or 8B) for which the horizontal lines each satisfying the above-mentioned requirement occurs successively becomes more than a predetermined length previously registered for the extension part. When the designated length is satisfied, the end of the relevant area, i.e., the top end of the extension part in FIG. 8A or 8B, i.e., is determined as the edge 2 of the component (OK in Step S39). When any of the above-mentioned requirements is not satisfied, output is made indicating that the edge 2 has not been detected (NG).

When both the edges 1 and 2 have been detected as a result of the above-described determinations of Steps S34 and S39 (OK in Step S39), the outer edge, i.e., the edge 2 is output as the final edge of the component (Step S40). On the other hand, when only either one of the edges 1 and 2 has been detected (OK in Step S41 or OK in Step S39), the thus-detected edge is output as the final edge of the component (Step S42 of S40). Further, when none of the edges 1 and 2 has been detected (NG in Step S41), a previously registered position is output as a final edge of the component (Step S43). That is, in Step S43, since edge detecting has been failed in, the edge of the relevant electronic component is estimated based on the deign data read out from the database 15 with respect to the position of the printed circuit substrate 17 placed on the mechanical table 16.

In the above-described embodiment, the photographed image is binarized, and therewith, the edge of the electronic component is detected. However, such binarization is not always necessary. Edge detection may be carried directly from the photographed image without binarization, with respect to the relevant threshold.

In the above-described method, the edge of the electronic component can be precisely recognized. Thereby, in the above-mentioned bridge inspection or such, the bridge inspection window or such can be located at an appropriate position, and as a result, the bridge inspection or such can be carried out accurately.

The operations described above with reference to FIGS. 7, 8A and 8B may be achieved in the following manner: For example, a CPU (not shown) included in the control apparatus 14 or the image processing apparatus 13 reads a component edge detecting program according to the present invention stored in a predetermined recording medium (such as a CD-ROM), or downloads the component edge detecting program from an external server via a communication network such as the Internet, a LAN or such, and writes it in a hard disk drive (not shown) also included in the control apparatus 14 or the image processing apparatus 13. After that, the CPU reads instructions of this program in sequence and executes the same, and as a result, automatic execution of the operations described above with reference to FIGS. 7, 8A and 8B can be achieved.

Further, the present invention is not limited to the above-described embodiments, and variations and modifications may be made without departing from the basic idea of the present invention claimed below.

The present application is based on Japanese priority application No. 2004-223926, filed on Jul. 30, 2004, the entire contents of which are hereby incorporated by reference.

What is claimed is:

1. A method for detecting an edge of a component mounted on a substrate, comprising:
   a first edge detecting step detecting an edge of the component from image data of the component based on first characteristic; and
   a second edge detecting step detecting an edge of the component from the image data of the component based on a second characteristic, wherein:
   in each of said first edge detecting step and said second edge detecting step, an edge detection target image area is defined by a search window from the image of the component, and image data included in the thus-defined edge detection target image area is applied for the edge detection.

2. The method as claimed in claim 1, wherein:
   said first characteristic concerning the component and said second characteristic concerning the component include threshold values of indexes expressing characteristics of image respectively.

3. The method as claimed in claim 1, wherein:
in each of said first edge detecting step and said second edge detecting step, edge detection is carried out as a result of it being determined whether or not the relevant characteristic of image occurs continuously for a predetermined size.

4. The method as claimed in claim 1, wherein:
said search window is set, with respect to the component, at a position in a positional relationship with respect to the substrate on which the component is mounted; and
in said second edge detecting step, when an edge of the component is detected in said first edge detecting step, at least one of a size and a setting position of the search window is adjusted based on a position of the thus-detected edge, while, when an edge of the component is not detected in said first edge detecting step, the search window is set in said second edge detecting step at a position previously registered in a positional relationship with respect to the substrate on which the component is mounted.

5. A computer-readable recording medium storing a program for causing a computer to execute a method for detecting an edge of a component mounted on a substrate, said program comprising instructions that when executed by the computer, cause the computer to perform:
a first edge detecting step detecting an edge of the component from image data of the component based on a first characteristic; and
a second edge detecting step detecting an edge of the component from the image data of the component based on a second characteristic, wherein:
said first characteristic concerning the component and said second characteristic concerning the component applied in said first edge detecting step and said second edge detecting step includes threshold values of indexes expressing characteristics of image, respectively.

6. A computer-readable recording medium storing a program for causing a computer to execute a method for detecting an edge of a component mounted on a substrate, said program comprising instructions that when executed by the computer, cause the computer to perform:
a first edge detecting step detecting an edge of the component from image data of the component based on a first characteristic; and
a second edge detecting step detecting an edge of the component from the image data of the component based on a second characteristic, wherein:
in each of said first edge detecting step and said second edge detecting step, edge detection is carried out as a result of determination being carried out as to whether or not the relevant characteristic of image occurs continuously for a size.

7. A computer-readable recording medium storing a program for causing a computer to execute a method for detecting an edge of a component mounted on a substrate, said program comprising instructions that when executed by the computer, cause the computer to perform:
a first edge detecting step detecting an edge of the component from image data of the component based on a first characteristic; and
a second edge detecting step detecting an edge of the component from the image data of the component based on a second characteristic, wherein:
in each of said first edge detecting step and said second edge detecting step, an edge detection target image area is defined by a search window from the image of the component, and image data included in the thus-defined edge detection target image area is applied for the edge detection.

8. The computer-readable recording medium as claimed in claim 7, wherein:
said search window is set, with respect to the component, at a position in a positional relationship with respect to the substrate on which the component is mounted; and
in said second edge detecting step, when an edge of the component is detected in said first edge detecting step, at least one of a size and a setting position of the search window is adjusted based on a position of the thus-detected edge, while, when an edge of the component is not detected in said first edge detecting step, the search window is set in said second edge detecting step at a position previously registered in a positional relationship with respect to the substrate on which the component is mounted.

9. A component inspection apparatus detecting an edge of a component mounted on a substrate, and carrying out appearance inspection based on the result of detection, comprising:
a first edge detecting part configured to detect an edge of the component from image data of the component based on a first characteristic; and
a second edge detecting part configured to detect an edge of the component from the image data of the component based on a second characteristic, wherein:
said first characteristic concerning the component and said second characteristic concerning the component include threshold values of indexes expressing characteristics of image respectively.

10. A component inspection apparatus, detecting an edge of a component mounted on a substrate, and carrying out appearance inspection based on the result of detection, comprising:
a first edge detecting part configured to detect an edge of the component from image data of the component based on a first characteristic; and
a second edge detecting part configured to detect an edge of the component from the image data of the component based on a second characteristic, wherein:
each of said first and second edge detecting parts carries out edge detection as a result of determining whether or not the relevant characteristic of image occurs continuously for a size.

11. A component inspection apparatus detecting an edge of a component mounted on a substrate, and carrying out appearance inspection based on the result of detection, comprising:
a first edge detecting part configured to detect an edge of the component from image data of the component based on a first characteristic; and
a second edge detecting part configured to detect an edge of the component from the image data of the component based on a second characteristic, wherein:
each of said first and second edge detecting parts defines an edge detection target image area by a search window from the image of the component, and applies image data included in the thus-defined edge detection target image area for the edge detection.

12. The component inspection apparatus as claimed in claim 11, wherein:
said search window is set, with respect to the component, at a position in a positional relationship with respect to the substrate on which the component is mounted; and when an edge of the component is detected by said first edge detecting part, said second edge detecting part adjusts at least one of a size and a setting position of the search window based on a position of the thus-detected edge, while said second edge detecting part sets the search window at a position previously registered in a positional relationship with respect to the substrate on which the component is mounted, when an edge of the component is not detected by said first edge detecting part.

* * * * *

UNITED STATES PATENT AND TRADEMARK OFFICE
CERTIFICATE OF CORRECTION

PATENT NO.        : 7,593,571 B2                                         Page 1 of 1
APPLICATION NO. : 10/986846
DATED             : September 22, 2009
INVENTOR(S)       : Akihiro Wakabayashi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1284 days.

Signed and Sealed this

Twenty-first Day of September, 2010

David J. Kappos
*Director of the United States Patent and Trademark Office*